(12) United States Patent
Hempfling

(10) Patent No.: US 6,382,892 B1
(45) Date of Patent: May 7, 2002

(54) WALL ANCHOR WITH IMPROVED DRILLING TIP

(76) Inventor: Dave C. Hempfling, 2157 W. Addison St., Chicago, IL (US) 60618

( * ) Notice: Subject to any disclaimer, the term of this patent is extended or adjusted under 35 U.S.C. 154(b) by 0 days.

(21) Appl. No.: 09/760,546

(22) Filed: Jan. 16, 2001

(51) Int. Cl.⁷ .......................... F16B 13/04; F16B 25/00
(52) U.S. Cl. ...................... 411/30; 411/178; 411/387.2
(58) Field of Search ............... 411/29, 30, 31, 411/178, 387.1, 387.2, 387.7, 387.8

(56) References Cited

U.S. PATENT DOCUMENTS

| | | | |
|---|---|---|---|
| 3,710,676 A | * | 1/1973 | Ringland ................. 411/387.7 |
| 4,601,625 A | | 7/1986 | Ernst et al. |
| 4,892,429 A | | 1/1990 | Giannuzzi |
| 5,039,262 A | | 8/1991 | Giannuzzi |
| 5,067,864 A | | 11/1991 | Dewey et al. |
| 5,160,225 A | | 11/1992 | Chern |
| 5,234,299 A | | 8/1993 | Giannuzzi |
| 5,308,203 A | | 5/1994 | McSherry et al. |
| 5,449,257 A | | 9/1995 | Giannuzzi |
| 5,482,418 A | | 1/1996 | Giannuzzi |
| 5,536,121 A | | 7/1996 | McSherry |
| 5,558,479 A | | 9/1996 | McElderry |
| 5,692,864 A | * | 12/1997 | Powell et al. ................. 411/30 |
| 5,752,792 A | | 5/1998 | McSherry |
| 5,833,415 A | | 11/1998 | McSherry |
| 5,944,295 A | | 8/1999 | McSherry |

FOREIGN PATENT DOCUMENTS

EP 0 933 536 6/1999

* cited by examiner

*Primary Examiner*—Neill Wilson
(74) *Attorney, Agent, or Firm*—Lisa M. Soliti; Mark W. Cooll; Donald J. Breh

(57) ABSTRACT

A wall anchor for use in a friable material, composed of a generally cylindrical body having a flanged end, a central portion, and a drill end. The drill end has a generally flat blade which includes a first portion and a second portion. The first portion has a first angled cutting edge and a first side cutting edge, and the second portion has a second angled cutting edge and a second side cutting edge. These portions are formed on a common line and are offset relative to each other along a plane passing through a diameter of the cylindrical body, and these portions together form a point. The central portion and the flange end have a combined axial length, and the drill end has an axial length which is shorter than that of the central portion and the flange end.

16 Claims, 1 Drawing Sheet

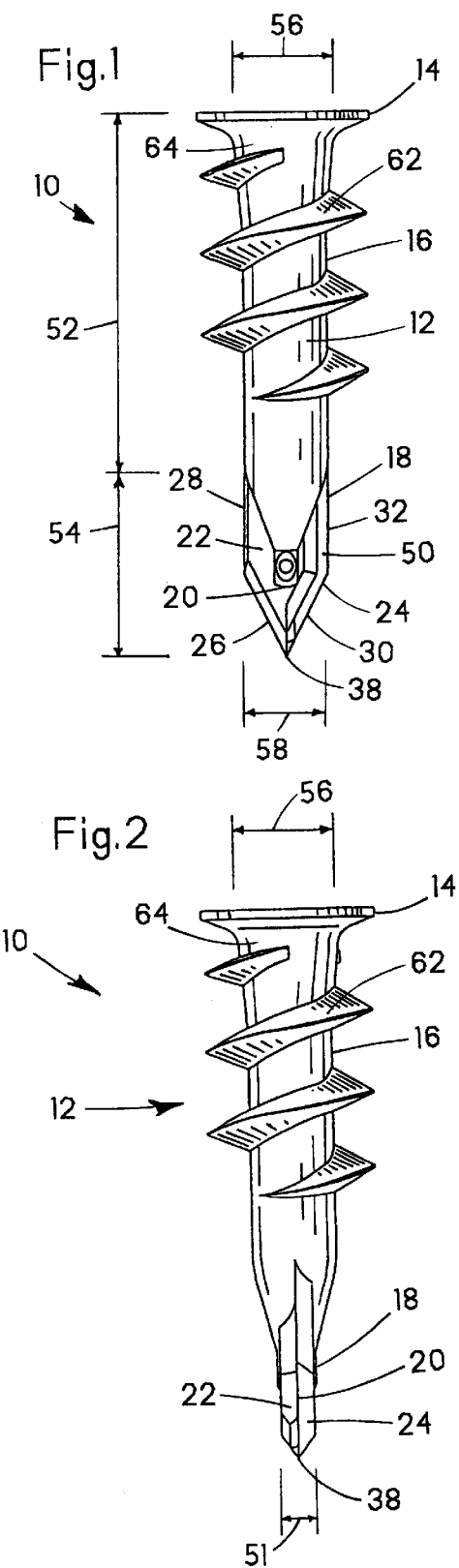
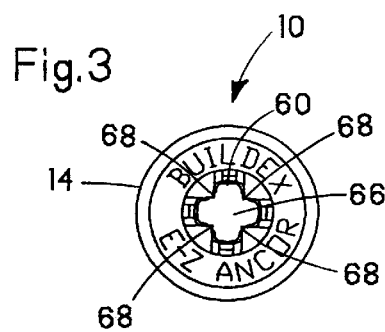
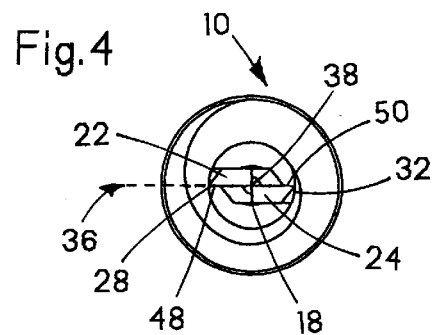
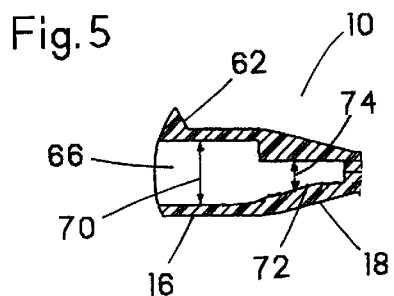

WALL ANCHOR WITH IMPROVED DRILLING TIP

BACKGROUND OF THE INVENTION

The present invention generally relates to wall anchors, and more specifically to wall anchors for use in a wall composed of a friable material such as drywall or gypsum wallboard. Wall anchors are known in the art, and generally take the form of a friction-fit anchor, which is hammered into the wall, or a self-drilling anchor, which is screwed into the wall. These wall anchors are used to mount articles to a wall that is made with gypsum wallboard. The wall anchors are usually made of a rigid plastic or a metal such as zinc.

Conventional self-drilling anchors are available from ITW Buildex Division, Itasca, Illinois under the mark "E-Z Anchor", and are disclosed in U.S. Pat. No. 4,601,625, which is incorporated by reference. Such self-drilling anchors are screwed into the wall by an installer using an insertion device such as a manual or powered Phillips-head screwdriver. Self-drilling anchors generally include three components: a flange which prevents the anchor from completely entering the wall and accepts the insertion device, a threaded portion on a generally tubular, cylindrical body that engages the friable material and draws the anchor into the wall, and a blade or drilling portion which drills or bores a hole into the friable material or substrate. Inside the cylindrical body is a central bore that accepts a threaded fastener, such as a screw into the anchor for mounting an article in place on the wall. Splines are usually disposed on the interior surface of the cylindrical body, extend longitudinally with respect to the body and engage the threaded fastener. The use of splines allows the threaded fastener to be relatively easily inserted into the wall anchor due to the small amount of contact surface area between the threaded fastener and the splines, and provides: secure mounting of the article to be mounted.

Upon installation of a fastener into the body, the drilling portion is caused to deflect laterally. This deflecting feature is beneficial in that it allows the use of a screw which has a predetermined length regardless of the thickness of the material being fastened. Also, in applications where the wallboard is installed against a hard surface such as concrete, the anchor is first threaded into the wallboard to create a hole. The installer then removes the anchor by counter-clockwise rotation, and manually breaks off the drilling portion. Next, the anchor is reinstalled into the wallboard. In this manner,. the broken off drilling portion does not become lodged between the wallboard and the wall, which would result in an unsatisfactory installation.

U.S. Pat. No. 5,558,479, to McElderry, which is incorporated by reference, discloses a wall anchor that has two types of splines disposed on the interior wall of the cylindrical body. A first type includes at least one spline protruding centrally at a narrow angle, and a second type including at least one spline protruding centrally at a wider angle. The different sized splines allow different sizes of fasteners to be inserted into the same sized wall anchor. When a #6 sheet metal screw (SMS) is inserted into the McElderry wall anchor, the first type of spline will primarily engage the threads of the #6 SMS. A relatively larger diameter #8 SMS can also be inserted into the McElderry wall anchor and both the first and second type of splines will engage the threads of the #8 SMS.

Prior art wall anchors have a problem of "walking", which refers to the anchor being screwed into the wall off-line, and are also relatively slow to install due to the relatively dull structure of their drilling portions. These drawbacks are generally more evident when the anchors are made of plastic rather than metal. Another problem that exists with the prior art anchors is that they generate gypsum dust or powder when being drilled into the drywall. In most cases, this dust or powder is ejected from the hole into which the anchor is being drilled, and leaves a messy residue. Further, the prior art wall anchors tear and rip the drywall paper.

It is therefore an object of the present invention to provide an improved wall anchor with a new sharp drill point which starts drilling faster and will not walk during installation.

Another object of the present invention is to provide an improved w all anchor with cutting edges or blades on the drill point which cut and remove gypsum faster during installation.

Still another object of the present invention is to provide an improved wall anchor with a stronger blade on the drill point which provides extra torsional strength.

A further object of the present invention is to provide an improved wall anchor with a new drill point design which reduces the amount of gypsum dust or powder ejected from the hole during drilling.

Yet another object of the present invention is to provide an improved wall anchor with a new drill point that cuts a clean hole in the drywall, resulting in less paper damage.

SUMMARY OF THE INVENTION

The above—identified objects are met or exceeded by the present wall anchor, which features an improved drilling tip. Being relatively shorter and sharper than conventional self drilling anchor tips, the present tip drills faster and more accurately. Thus, unwanted "walking" is minimized. In addition, the present anchor generates less gypsum dust, resulting in a cleaner installation. Also, the relatively shorter tip has greater tortional strength than self conventional drilling anchors.

More specifically, the present wall anchor is for use in a friable material, and includes a generally cylindrical body having a flanged end, a central portion, and a drill end. The drill end has a generally flat blade including a first portion and a second portion. The first portion has a first angled cutting edge and a first side cutting edge, and the second portion has a second angled cutting edge and a second side cutting edge. These portions are formed on a common line and are offset relative to each other along a plane passing through a diameter of the cylindrical body. The central portion and the flange end have a combined axial length, and the drill end has an axial length which is shorter than that of the central portion and the flange end.

BRIEF DESCRIPTION OF THE DRAWING

FIG. 1 is a front elevational view of the present invention;

FIG. 2 is a side elevational view of the present invention;

FIG. 3 is an end view of the present invention of FIG. 1 taken from the top of FIG. 1;

FIG. 4 is an end view of the present invention of FIG. 1 taken from the bottom of FIG. 1; and FIG. 5 is a fragmentary vertical sectional view showing the central bore of the wall anchor.

DESCRIPTION OF THE PREFERRED EMBODIMENT

Referring now to FIGS. 1 and 2, a wall anchor for use in friable material is generally designated 10. The wall anchor 10 has a generally cylindrical body 12 having a flanged end 14, a central portion 16, and a drill end 18. In the preferred embodiment of the wall anchor 10, the cylindrical body 12 is made of plastic. However, it is also contemplated that the cylindrical body 12 could be made out of zinc or a similar metal. The drill end 18 has a generally flat blade 20 with a first portion 22 and a second portion 24. The first portion 22 has a first angled cutting edge 26 and a first side cutting edge 28, and the second portion 24 has a second angled cutting edge 30 and a second side cutting edge 32. As best seen in FIG. 4, these portions 22 and 24 are formed on, and are offset relative to each other along a plane 36 passing through a diameter of the cylindrical body 12. Further, in the preferred embodiment, at least one and preferably each of the portions 22, 24 form a point 38. In fact, the angled cutting edges 26, 30, 28 and 32 respectively are formed by the offset positioning of the two portions 22, 24.

It is the configuration of the flat blade 20 that allows the present wall anchor 10 to achieve the objects stated above. The point 38 is relatively sharp, which allows for faster drilling and prevents walking during installation. In addition, the point 38 is not accompanied by supplemental projections, as is the tip disclosed in U.S. Pat. No. 4,601,625. Also, the first and second angled cutting edges 26 and 30, along with the first and second side cutting edges 28 and 32 are all sharp, which cut and remove gypsum faster during installation.

Referring to FIG. 4, the offset disposition of the first portion 22 from the second portion 24 creates a first flute 48 and a second flute 50. The first flute 48 is disposed on an underside of the first portion 22 and extends along the length of both the first angled cutting edge 26 and the first side cutting edge 28. Similarly, the second flute 50 is disposed on an underside of the second portion 24 and extends along the length of both the second angled cutting edge 30 and the second side cutting edge 32. The first and second flutes 48 and 50 also help to quickly remove gypsum dust generated during installation of the anchor 10 in wallboard.

In FIGS. 1 and 2, the central portion 16 has a diameter 56 which narrows slightly and gradually from the flange end 14 to the central portion 16, and the drill end 18 has a diameter 58, which is smaller than that of the central portion. Best seen in FIG. 2, the flat blade 20 is relatively thick compared to the diameter 56 of the central portion 16, which increases the strength of the blade, and provides extra torsional strength. In a preferred embodiment, a thickness 51 of the flat blade 20 is generally one third (⅓) of the diameter 56 of the central portion 16 found near the flange end 14. It is contemplated, however, that the thickness of the flat blade 20 could be increased or decreased, and still provide enough torsional strength for drilling into gypsum wallboard. It is contemplated that the thicker blade 20, especially when the anchor 10 is made of plastic, will provide more precise drilling action and will be less prone to "walking".

Referring now to FIG. 1, the central portion 16 and the flange end 14 have a combined axial length 52, and the drill end 18 has an axial length 54 which in the preferred embodiment is shorter than that of the central portion and the flange end. In the preferred embodiment, the axial length 54 of the drill end 18 is approximately less than three-eighths (⅜) of the axial length 52 of the central portion 16 and the flange end 14. It is contemplated that the relative axial length 54 of the drill end may vary relative to the axial length 52, however in general shorter relative length 54 is preferred. This is because a shorter drill end 18 results in a stiffer drilling point.

The features of the drill end 18 as described above provide the p resent wall anchor 10 with features not found in the prior art wall anchors. One such feature is that the present drill end 18 starts drilling and removing gypsum faster and prevents walking during installation. This is due to the relatively shorter length of the blade 20 and the relative sharpness of the cutting edges 26, 28, 30 and 32. There is also less gypsum dust or powder to clean up when using the present wall anchor 10 compared to prior art wall anchors. Further, this new drill end 18 enables the present wall anchor 10 to cut a clean hole in the drywall resulting in less paper damage compared to prior art wall anchors.

Referring now to FIG. 3, the flange end 14 has a Phillips-type drive recess 60 configured for accepting a manual or powered Phillips-head screw-driver. However, it is contemplated that the recess on the flange end 14 could be provided in any shape desired which is suitable for accepting different insertion devices including, but not limited torx-drive, Allen-type or flat-blade screw-drivers. Once inserted into the drive recess 60, the insertion device is turned in a clockwise direction to insert the wall anchor 10 into the wallboard. Conversely, rotating the wall anchor 10 in a counter-clockwise direction will remove the anchor 10 from the wallboard.

Now referring back to FIGS. 1 and 2, the cylindrical body 12 has an exterior helical thread 62 disposed between the flange end 14 and the drill end 18. There is also an unthreaded neck portion 64 disposed in between the flange end 14 and the exterior thread 62. As is well known in the art, the exterior thread 62 pulls the wall anchor 10 into the wallboard, and the unthreaded neck 64 allows the flange end 14 to become flush with an exterior surface of the wallboard.

As can be seen in FIGS. 3 and 5, the wall anchor 10 has a central bore 66 defined inside the cylindrical body 12, and has a surface lined with axially oriented splines 68. The configuration of the splines 68 on the central bore 66 is described in more detail in U.S. Pat. No. 5,558,479, incorporated by reference. This configuration of splines 68 allows for a variety of screw sizes, for example #6, #7, and #8 diameter SMS, to be used in conjunction with the present wall anchor 10.

Referring now to FIG. 5, the central bore 66 preferably has a constant diameter 70 through the central portion 16 until the drill end 18, where the central bore has a ramped configuration 72 resulting in a decreased diameter 74. The ramped configuration 72 of the central bore 66 facilitates the lateral deflection or ultimate frangibility of the flat blade 20 when a fastener of sufficient length is driven into the present wall anchor 10.

While a particular embodiment of the present improved wall anchor has been shown and described, it will be appreciated by those skilled in the art that changes and modifications may be made thereto without departing from the invention in its broader aspects and as set forth in the following claims.

What is claimed is:

1. A wall anchor for use in friable material, comprising:
    a generally cylindrical body having a flanged end, a central portion, and a drill end;
    a central bore defined inside said cylindrical body; and
    said drill end having a generally flat blade, including a first portion having a first angled cutting edge and a first side cutting edge, and a second portion having a second angled cutting edge and a second side cutting edge, said portions being formed on a common line and offset relative to each other along a plane passing through a diameter of said cylindrical body.

2. The wall anchor of claim 1, wherein a first flute is formed on an underside of said first portion, and a second flute is formed on an underside of said second portion.

3. The wall anchor of claim 1, wherein said central portion and said flange end have a combined axial length, and said drill end has an axial length which is shorter than that of said central portion and said flange end.

4. The wall anchor of claim 3, wherein said axial length of said drill end is approximately less than three-eighths (3/8) of said combined axial length of said central portion and said flange end.

5. The anchor of claim 1, wherein said flange end has a Phillips-type drive recess.

6. The anchor of claim 1, wherein said cylindrical body has an exterior thread disposed thereon between said flange end and said drill end.

7. The anchor of claim 6, further comprising an unthreaded neck disposed between said flange end and said exterior thread.

8. The anchor of claim 1 wherein said central bore has a surface lined with axially oriented splines.

9. The anchor of claim 8, wherein said central bore has a constant diameter through said central portion until said drill end, where said central bore has a ramped configuration defining a decreased diameter.

10. The anchor of claim 1, wherein said cylindrical body is made of plastic.

11. The anchor of claim 1, wherein said cylindrical body is made of zinc.

12. The anchor of claim 1, wherein at least one of said first and second angled cutting edges form a point.

13. A wall anchor for use in a friable material, comprising:
a generally cylindrical body having a flanged end, a central portion, and a drill end;
a central bore defined inside said cylindrical body;
said drill end having a flat blade;
said flat blade including a first portion having a first angled cutting edge and a first side cutting edge, and a second portion having a second angled cutting edge and a second side cutting edge, said portions being formed on a common line and offset relative to each other along a plane passing through a diameter of said cylindrical body;
said central portion and said flange end have an axial length, and said drill end has an axial length ;approximately less than three-eighths (3/8) of said combined axial length of said central portion and said flange end; and
said central portion has a diameter, and said drill end has a diameter shorter than that of said central portion.

14. The wall anchor of claim 13, wherein a first flute is formed on an underneath edge of said first portion, and a second flute is formed on an underneath edge of said second portion.

15. The anchor of claim 13, wherein said cylindrical body has an exterior thread disposed thereon between said flange end and said drill end.

16. The anchor of claim 13 wherein said central bore has a surface lined with axially oriented splines.

* * * * *